(12) United States Patent
Black et al.

(10) Patent No.: US 8,340,099 B2
(45) Date of Patent: Dec. 25, 2012

(54) CONTROL OF BACKGROUND DATA TRANSFERS

(75) Inventors: Richard John Black, Cambridge (GB); Dinan Gunawardena, Cambridge (GB); Peter Key, Cambridge (GB); Gregory O'Shea, Cambridge (GB)

(73) Assignee: Microsoft Corporation, Redmond, WA (US)

(*) Notice: Subject to any disclaimer, the term of this patent is extended or adjusted under 35 U.S.C. 154(b) by 127 days.

(21) Appl. No.: 12/503,657

(22) Filed: Jul. 15, 2009

(65) Prior Publication Data

US 2011/0013516 A1 Jan. 20, 2011

(51) Int. Cl.
*H04L 12/28* (2006.01)

(52) U.S. Cl. .................................. 370/395.2

(58) Field of Classification Search .. 370/395.2–395.52, 370/464, 465; 709/227–232, 237, 238, 246
See application file for complete search history.

(56) References Cited

U.S. PATENT DOCUMENTS

| | | | | |
|---|---|---|---|---|
| 5,193,151 A * | 3/1993 | Jain | | 709/237 |
| 5,812,528 A | 9/1998 | VanDervort | | |
| 6,201,791 B1 * | 3/2001 | Bournas | | 370/234 |
| 6,622,172 B1 * | 9/2003 | Tam | | 709/232 |
| 6,754,228 B1 * | 6/2004 | Ludwig | | 370/468 |
| 6,757,255 B1 * | 6/2004 | Aoki et al. | | 370/252 |
| 6,882,622 B1 | 4/2005 | Donoghue | | |
| 7,020,083 B2 * | 3/2006 | Garcia-Luna-Aceves et al. | | 370/230 |
| 7,304,951 B2 * | 12/2007 | Rhee | | 370/235 |
| 7,418,494 B2 | 8/2008 | Dahlin et al. | | |
| 7,516,238 B2 * | 4/2009 | Key et al. | | 709/232 |
| 7,778,164 B2 * | 8/2010 | Shimonishi | | 370/229 |
| 2002/0010775 A1 | 1/2002 | Rakavy et al. | | |
| 2005/0018617 A1 * | 1/2005 | Jin et al. | | 370/252 |
| 2005/0071451 A1 | 3/2005 | Key et al. | | |
| 2007/0016688 A1 | 1/2007 | Hester et al. | | |
| 2007/0076726 A1 * | 4/2007 | Weston et al. | | 370/401 |

(Continued)

FOREIGN PATENT DOCUMENTS

EP 1744495 A1 1/2007

(Continued)

OTHER PUBLICATIONS

"Background Intelligent Transfer Service", retrived at <<http://www.anvir.com/background-intelligent-transfer-service.htm on Jul. 14, 2009.

(Continued)

*Primary Examiner* — Dimitry H Levitan
(74) *Attorney, Agent, or Firm* — Zete Law, P.L.L.C.; MacLane C. Key

(57) ABSTRACT

Control of background data transfers is described. In an embodiment, a background data transfer is controlled at a receiver node by measuring a time period taken to receive from a sender node a data sequence of the same size as a receive window. The time period is used to evaluate available network capacity, and the network capacity used to calculate a new window size. The new window size is applied and communicated to the sender node. In another embodiment, a background data transfer is controlled at a receiver node by measuring a quantity of data received from a sender node during a first control interval. The measured quantity is used to evaluate available network capacity, and the network capacity used to calculate a new receive window size and a second control interval duration. The new window size is applied for the second control interval, and communicated to the sender node.

20 Claims, 9 Drawing Sheets

U.S. PATENT DOCUMENTS

2007/0189292 A1* 8/2007 Singh et al. .................. 370/392

FOREIGN PATENT DOCUMENTS

| EP | 1744496 A1 | 1/2007 |
|---|---|---|
| WO | WO2008093066 A2 | 8/2008 |

OTHER PUBLICATIONS

Key et al., "Emulating Low-priority Transport at the Application Layer: A Background Transfer Service", SIGMETRICS/Performance' 04, Jun. 12-16, 2004, ACM, 2004, pp. 1-12.

Kuzmanovic et al., "TCP-LP: A Distributed Algorithm for Low Priority Data Transfer", Department of Electrical and Computer Engineering, Rice University, 2003, pp. 1691-1701.

Venkataramani et al., "TCP Nice: A Mechanism for Background Transfers", Laboratory of Advnaced Systems Research, Department of Computer Sciences, University of Tesxas at Austin, pp. 1-15.

EPO Office Action response filed May 20, 2008 for EP 05015419.4, 17 pages.

EPO Office Action dated Jan. 29, 2008 for EP 05015419.4, 5 pages.

European Search Report dated Nov. 29, 2005 from EP 05015419.4, 8 pages.

European Search Report dated Dec. 27, 2005 from EP 05015418, 4 pages.

Examiner Interview Summary dated Nov. 26, 2009 from EP 05015419.4, 3 pages.

Hasegawa, et al., Receiver-based Management Scheme of Access Link Resources for QoS-Controllable TCP Connections, retrieved from <<http://www.anarg.jp/achievements/web2004/papers/hasegawa04SoftCOM-Receiver.pdf>> on Jun. 21, 2011, Oct. 2004, pp. 1-5.

Informal response sent to EPO on Oct. 21, 2009 for EP 05015419.4, 6 pages.

OA response filed Nov. 28, 2007 for EP 05015419.4 (17 pages).

Semke, et al., Automatic TCP Buffer Tuning, Computer Communication Review, Association for Computing Machinery, New York, US, vol. 28, No. 4, Oct. 1998, pp. 315-323.

\* cited by examiner

CONTROL OF BACKGROUND DATA TRANSFERS

BACKGROUND

Different communications across a network can have different levels of priority depending on the purpose of the communication. Typically, user operations such as file access, email access and web services are considered of higher priority than background operations such as downloading program updates, synchronizing application data and backing up local files. The user operations are considered higher priority because delays in the traffic are noticeable to the user and can lead to pauses in operations, whilst the background operations require little or no user interaction and therefore a user is unlikely to notice any delays.

In one background operation, program updates can be downloaded to the user's system in the 'background', while the user works normally on other tasks in the 'foreground'. After the program updates are downloaded, the user can be notified of the presence of the program updates on his or her system and prompted for authorization to install the new updates. The higher priority communications are referred to herein as 'foreground transfers' whilst the lower priority communications are referred to as 'background transfers'.

When a network becomes busy or a foreground transfer requests more bandwidth, it is beneficial if the background transfers back-off and reduce their bandwidth so that the foreground transfers are given priority. Ideally the background operations do not impact the foreground transfers.

Some approaches have been proposed for managing background transfers, however, these typically require specific intelligence in the network to achieve the bandwidth management of the background transfer. This requirement limits the applicability of the approaches to only those networks where the specific intelligence is available.

Other approaches that have been proposed that operate without intelligence in the network by controlling the rate at which background transfers are sent to a receiving node. Typically, such approaches are implemented at the sending node, as this node can directly control the data that is sent. However, whilst this is simpler to implement at the sending node, the sending node cannot directly see the effect of the network and its conditions on the transfer. Furthermore, these techniques are limited in their responsiveness to changes in the conditions in the network, and are not adaptable to different types of networks with different characteristics. Furthermore, these do not comply with standardized transport protocols.

The embodiments described below are not limited to implementations which solve any or all of the disadvantages of known background data transfer techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Control of background data transfers is described. In an embodiment, a background data transfer is controlled at a receiver node by measuring a time period taken to receive from a sender node a data sequence of the same size as a receive window. The time period is used to evaluate available network capacity, and the network capacity used to calculate a new window size. The new window size is applied and communicated to the sender node. In another embodiment, a background data transfer is controlled at a receiver node by measuring a quantity of data received from a sender node during a first control interval. The measured quantity is used to evaluate available network capacity, and the network capacity used to calculate a new receive window size and a second control interval duration. The new window size is applied for the second control interval, and communicated to the sender node.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
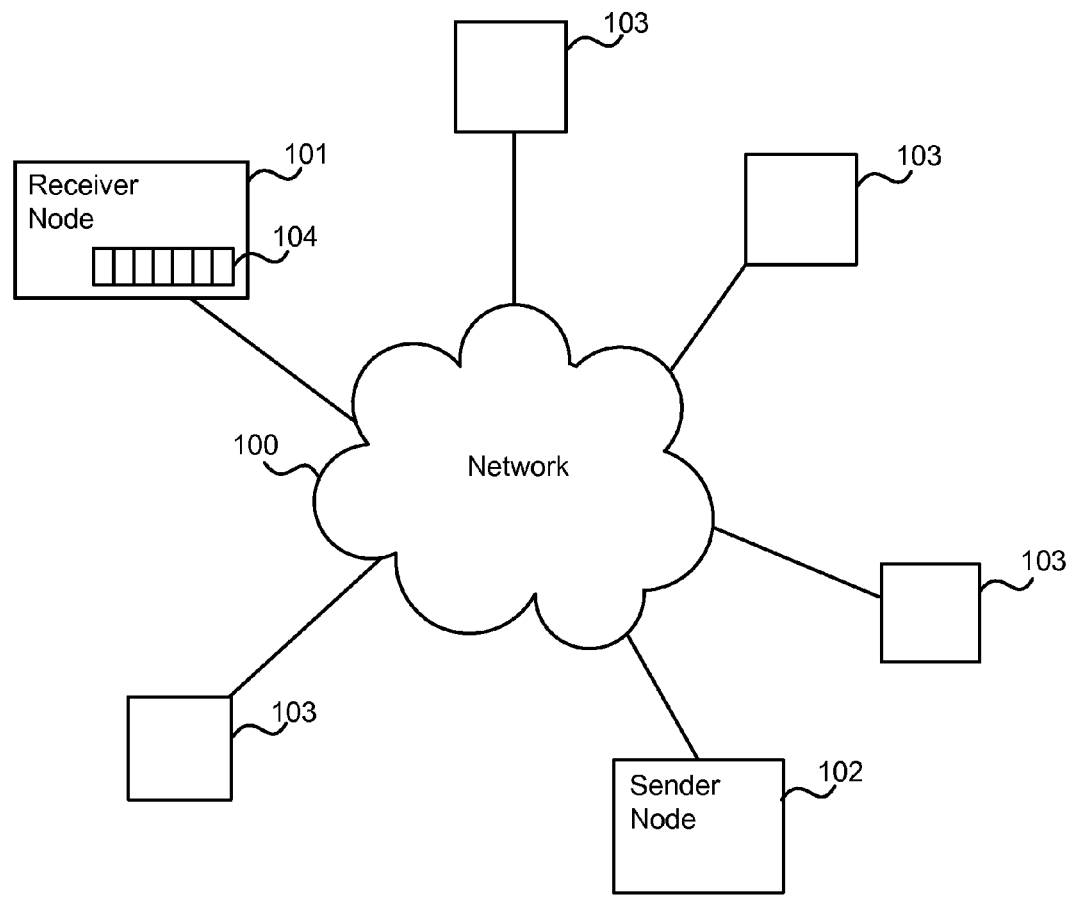
FIG. 1 illustrates a schematic diagram of a communication system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a transport control protocol (TCP) system, the system described is provided as an example and not a limitation. As those skilled in the art will appreciate, the present examples are suitable for application in a variety of different types of networking systems using different protocols.

TCP is a connection-oriented protocol; that is two nodes in a communications network establish a TCP connection with one another before they exchange data using TCP. Each end of a TCP connection has a finite amount of buffer space. A receiving TCP node only allows the other end to send as much data as the receiver has buffers for. This prevents a fast host from overflowing the buffers on a slow host. TCP's flow control is provided by each end advertising a window size. This is the number of bytes, starting with the one specified by an acknowledgement number field, that the receiver is willing to accept. The window size defines the number of unacknowledged TCP data segments that can be in flight to the receiver node at the same time.

A sliding window method is used to enable the flow control mechanism. In high level terms, this window can be thought of as sliding along as data is received, acknowledged, and read from the receiver buffer. The window is considered to close or shrink (i.e. get smaller) as data is received (but not read from the buffer), and open (i.e. get larger) when the receiving process reads data, freeing up space in its TCP receive buffer. When the window shrinks to become a zero window then the sender is prevented from transmitting any data. In that case, the buffers at the receiver are full; the receiver advertises a zero window and the sender stops transmitting more data. When the receiver later empties its buffers (at least partially) a window update (which is a type of ACK message) is sent advertising that the receiver can now receive a specified number of bytes. This window update message does not acknowledge any new data; rather, it just opens the window.

Described herein are examples of a technique to control a background data transfer by controlling the size of the receive window at the receiver node. The technique can be enabled on a per-connection basis to permit the connection to behave as low-priority (i.e. background) with respect to other traffic on the network. This works by using the round trip time (RTT) and/or the recent bandwidth achieved, to adjust the advertised receive window on the TCP connection. By implementing the technique at the receiver node (rather than the sender node), the effect of the network conditions on the transfer can be directly measured and the background transfer adapted accordingly.

Regular TCP in normal operation has a full receive window's worth of data in flight in the network at any given time. When a network has a bottleneck link, this results in the receive window's worth of data minus the bandwidth delay product being queued at the bottleneck link (where the bandwidth delay product is the product of the link capacity and its end-to-end delay). The background transfer technique described herein finely tunes the advertised receive window to control the sender node to use the maximum data rate available to utilize idle bandwidth without introducing queues at the bottleneck.

This improves the latency of interactive traffic to be almost that which would be observable if the background transfer connection was not present. In addition, the background transfer technique uses the change in the bandwidth obtained on its connection to infer the presence of packets of other connections, and if this occurs the background transfer technique reduces the receive window still further so that a regular TCP connection obtains most of the bandwidth on the bottleneck link.

Reference is first made to FIG. 1 which illustrates a schematic diagram of a communication system in which the background transfer technique can operate. A network 100 connects a receiver node 101, a sender node 102, and a plurality of other nodes 103 to each other and to other communications networks (not shown). The network can be any suitable network such as the internet, a local area network, a wide area network, an intranet or other network.

By way of example, the receiver node 101, which can be a PC, is to receive a background transfer (e.g. a program update) from the sender node 102, which can be a network server. At the same time as the background transfer of data from the sender node 102 to the receiver node 101, there can be many other operations, both foreground and background transfers, between the receiver node 101, the sender node 102, and the plurality of other nodes 103. The receiver node 101 includes a receive window 104 associated with the background connection.

Figure 2:
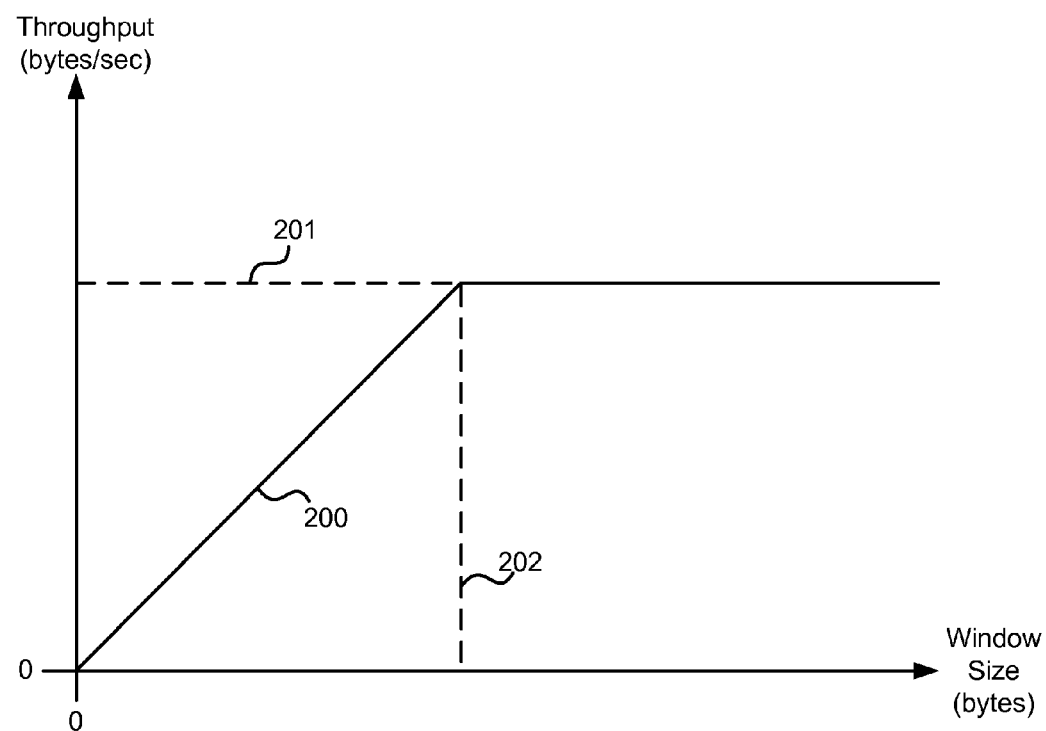
FIG. 2 illustrates an example graph illustrating throughput against receive window size.
Figure 3:
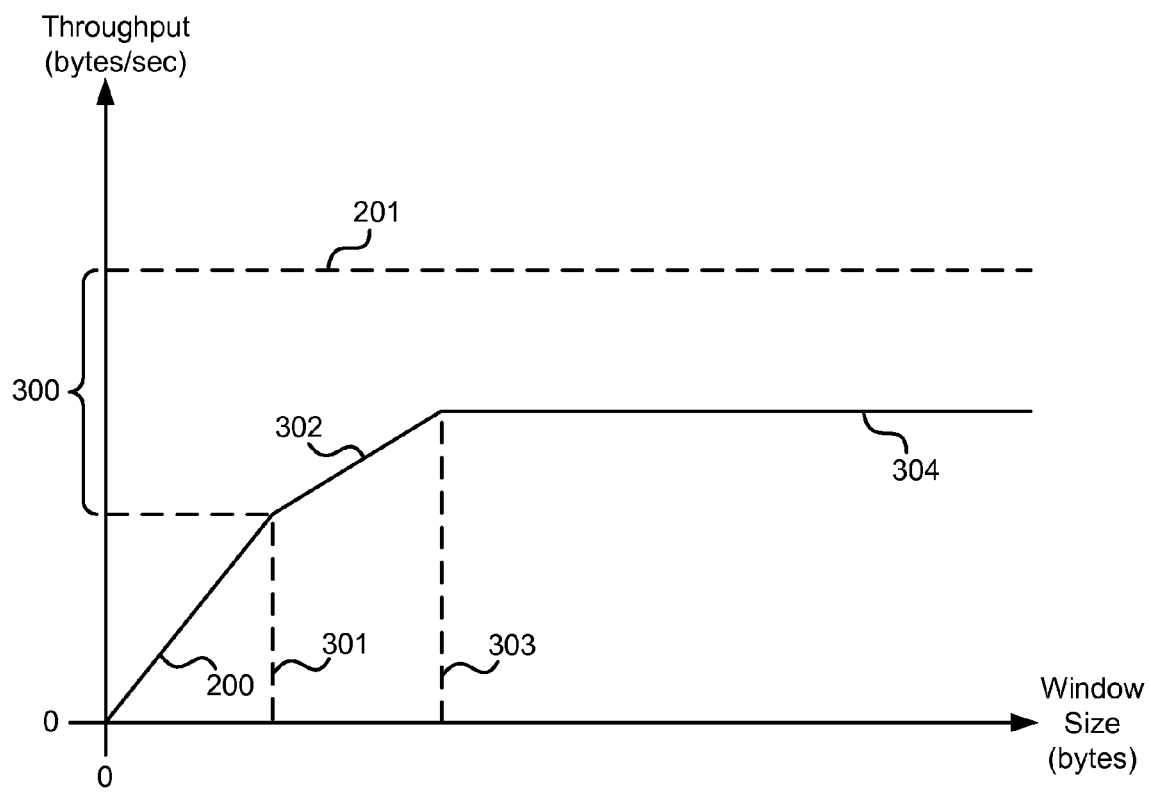
FIG. 3 illustrates an example graph illustrating throughput against receive window size with a competing data transfer.

Reference is now made to FIGS. 2 and 3 which illustrate the behavior of data transfer at the receiver node 101 for different receive window sizes. Referring first to FIG. 2, an illustrative graph is shown which indicates the change in throughput that is seen at the receiver node in the case of a fixed bandwidth bottleneck link (with no other competing traffic) for different receive window sizes. As mentioned, TCP permits several packets to be in flight at once, which is bounded by the receive window size (which is dynamic). If the receive window is very large it is straightforward to see that the throughput obtained by the connection is limited by the capacity 201 of the link itself. Conversely, if the receive window is very small it is again obvious that that the throughput obtained is much smaller than the link capacity. In between these values the throughput rises linearly with the receive window size at a gradient 200 until the link capacity 201 is reached at window size 202.

FIG. 3 illustrates a scenario in which another connection is also using the link. As above, FIG. 3 indicates the change in throughput that is seen at the receiver for different receive window sizes. In the example of FIG. 3, the other connection is only able to use portion 300 of the link. The throughput again rises linearly, with gradient 200, as the window size increases until it consumes the portion of the link not being used by the other connection (i.e. until it consumes the link capacity 201 minus the portion 300 used by the other connection). After this point, at window size 301, the throughput rises more slowly with larger windows (with gradient 302), because the additional packets are experiencing queuing contention, and the maximum throughput obtained at window size 303 is limited by the competition of the other connection. Note that the exact partitioning of the throughput between connections depends on how the other connection is being constrained, and that FIG. 3 is merely an illustrative example.

In both FIGS. 2 and 3 above, there is a point where the initial linear increase of the throughput with the window ends, and a lower (possibly zero) increase begins. This is window size 202 in FIG. 2, and window size 301 in FIG. 3. The background transfer technique attempts to find that point and operate the connection with that value of the receive window size. Note that in practice this point can change dynamically, and that other connection(s) can be present that are capable of utilizing the entire bandwidth.

Previous background transfer control techniques attempted to set the size of the receive window by measuring the throughput of a connection over the course of a fixed control time-interval, and determining whether to increase or decrease the receive window at the end of the control interval. However, using a fixed control interval is problematic because at least one round trip time is needed to observe a change in throughput generated by a window change. Because various connections and networks have different RTTs a control interval is needed that is at least one RTT. The selected control interval must therefore be sufficiently large for the largest RTT expected to be encountered. The use of an excessively small control interval can cause a background transfer to back-off without reason for one control interval, and to increase the window too much the subsequent control interval, causing high oscillations in the receive window size (this is known as the 'drunk window syndrome').

As the window can only be changed at the end of a fixed control interval, the responsiveness of such a technique is limited by the length of the control interval. As stated, the control interval can be excessively long with a fixed size interval. Furthermore, because the changes to the receive window size are occurring at the end of the control interval, this is most likely asynchronous with data arrival at the receiver node. Sudden decreases in the window size occurring at the end of the control interval mean that the receiver reneges on window sizes that were advertised in previous acknowledgement messages. Going back on the advertised window breaks RFC recommendations.

Figure 4:
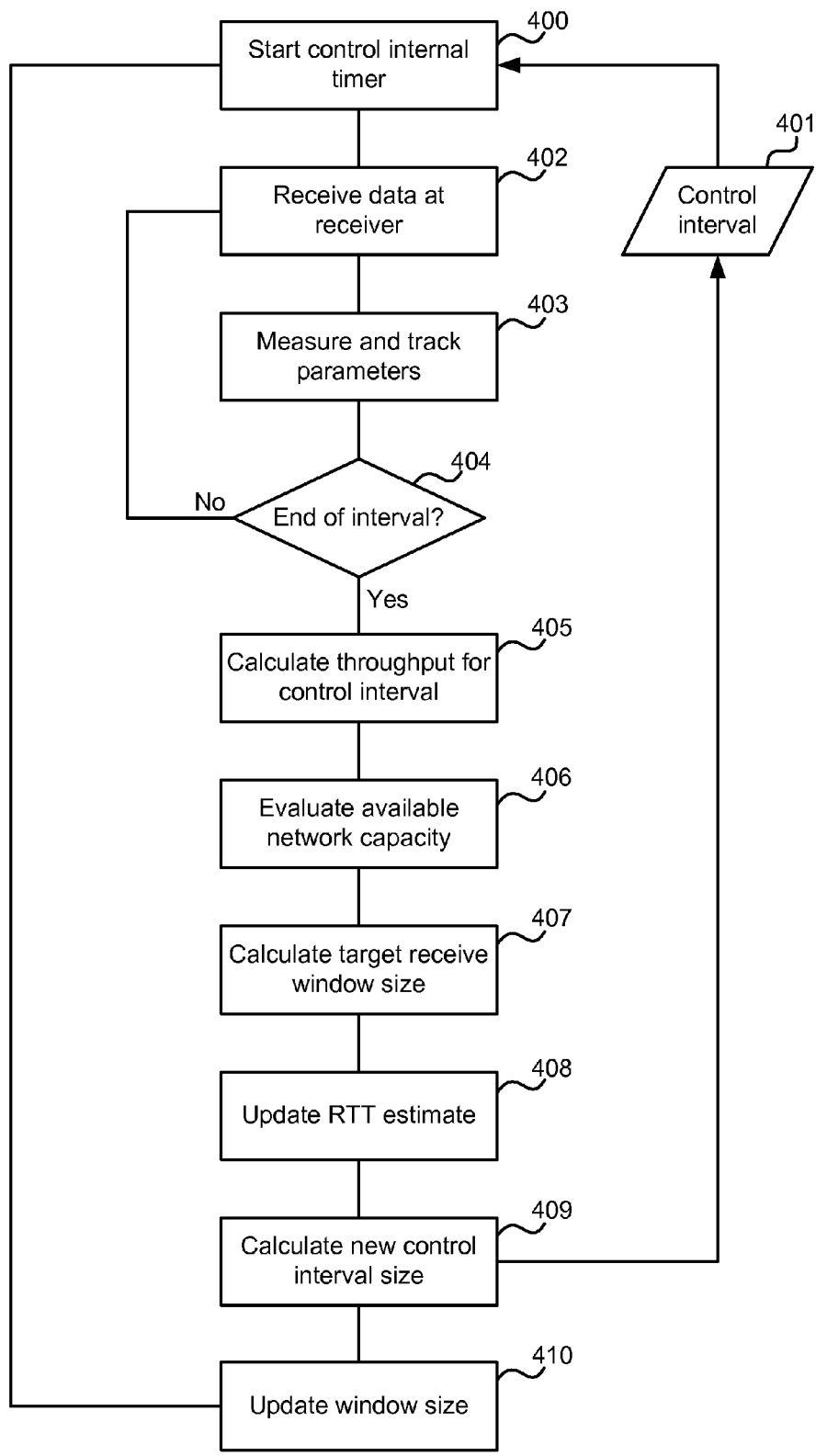
FIG. 4 illustrates a flowchart of a process for controlling a background transfer with a dynamic control interval.

Reference is now made to FIG. 4, which illustrates a flowchart of a process for controlling a background transfer with a dynamic control interval. The process in FIG. 4 improves the responsiveness and avoids the 'drunk window syndrome' of a background transfer control algorithm by ensuring that the control interval used is appropriate for the current network conditions. The process of FIG. 4 is performed at the receiver node 101.

The process of FIG. 4 begins by starting 400 a control interval timer. This comprises reading a value for the control interval 401 stored at the receiver node 101. The first time that the process in FIG. 4 is executed, the control interval 401 can be initialized to a suitable value. For example, the control interval 401 can be initialized to one second. The timer begins counting down the control interval time period.

Whilst the timer is running, the receiver node receives 402 data from the sender node 102. The data is received, acknowledged and read in accordance with the TCP flow control mechanisms. In other words, the rate at which data is received is controlled by the receive window size advertised by the receiver node in acknowledgement packets and the sliding window mechanism. The first time that the process of FIG. 4 is executed, the receive window size can be initialized to an appropriate value. An example initial value for the receive window size is three times the maximum segment size (MSS) for the TCP connection. The maximum segment size defines the overall maximum size for a TCP segment, including header and data.

As the data is received and acknowledged by the receiver node 101, a number of parameters are measured 403. The receiver node 101 keeps track of the amount of data received during the control interval (e.g. the number of segments received during this interval). In addition, the receiver node 101 keeps track of an estimate of the current round trip time (RTT), which can be based on an observed delay with which each receive window of data is received during the control interval.

Once it is determined 404 that the timer has expired, and the control interval has completed, then the receiver node calculates 405 the received throughput observed for the control interval. The observed throughput is calculated as:

$$X_n = \frac{B_n}{T_n}$$

Where $X_n$ is the observed throughput for the $n^{th}$ control interval, $B_n$ is the number of bytes received during the control interval, and $T_n$ is the duration of the control interval in seconds. As an alternative to the number of bytes $B_n$, the calculation can use $N_n \times MSS$, where $N_n$ is the number of segments received during the $n^{th}$ control interval.

The observed throughout is then used to evaluate 406 the available network capacity. For example, the observed throughput can be used to determine whether the connection is contending with other traffic on the link. This can be achieved by comparing the observed throughput to an expected throughput that would be attained in the absence of contention on the link (i.e. a throughput expected if the rate is limited by the receive window). In other words, with reference to FIGS. 2 and 3, this determines whether the connection is operating in the portion of the graph having the gradient 200, in which the throughput changes linearly with window size.

The expected throughput can be calculated simply as:

$$X_e = \frac{W_n}{RTT_{min}}$$

Where $X_e$ is the expected throughput, $W_n$ is the window size for the $n^{th}$ control interval, and $RTT_{min}$ is an estimate of the minimum RTT for the connection (described hereinafter). In other words, if the throughput is limited by the window, then it would be expected that a full window of bytes is received in one RTT. The gradient 200 in FIGS. 2 and 3 is therefore given by $1/RTT_{min}$.

However, in practice, changes in the advertised window size cannot be observed immediately in the throughput. For example, in this scenario, until the next round trip time after changing the window size at the end of a control interval the throughput does not change, but rather remains at the previous throughput. Therefore, the expected throughput is adjusted to take this into account. The expected throughput can therefore be calculated as:

$$X_e = \frac{W_n}{RTT_{min}} - 2\left(\frac{W_n - W_{n-1}}{T_n}\right)$$

In other words, the expected throughput is adjusted by a correction throughput given by twice the magnitude of the change in the window size (between the $n^{th}$ and $(n-1)^{th}$ intervals) for the $n^{th}$ control interval duration, due to the lag in the window size affecting the throughput.

The observed throughput is compared to the expected throughput by determining whether the observed throughput is within a certain threshold of the expected throughput. This is determined using the following Boolean test:

$$X_n \geq (1-\epsilon)X_e$$

Where $\epsilon$ is a tolerance threshold. This test is denoted 'test 1' hereinafter. In one example, $\epsilon$ is 0.1. If the result is true, then this indicates that the connection is not contending with other traffic for bandwidth (i.e. the operation is on, or near to, the gradient 200 in FIGS. 2 and 3). Otherwise, this indicates that the connection is contending for bandwidth with other traffic.

The above 'test 1' is then used to calculate 407 a new target receive window size. As mentioned, the aim of the background transfer control process is to control the receive window size to be the maximum value that it can be without contending with other traffic. In other words, the desired receive window size is the maximum value whilst still on the gradient 200 of FIGS. 2 and 3 (i.e. window size 202 in FIG. 2 and window size 301 in FIG. 3). This is the optimum receive window size.

If 'test 1' holds true, then the receive window is increased in size, i.e. $W_{n+1} > W_n$. Conversely, if the test fails, then the receive window is decreased in size, i.e. $W_{n+1} < W_n$. The optimum window size to advertise is found and tracked dynamically using a form of binary search. The binary search process maintains a window size search-range between a minimum value $W_{min}$ and a maximum value $W_{max}$. The target window size lies between these values. These values can be initialized to appropriate values. In one example, $W_{min}$ is initialized to 2×MSS and $W_{max}$ is initialized to 12×MSS. The values of $W_{min}$ or $W_{max}$ are adjusted such that the search range hones in on the optimum receive window size over subsequent control intervals.

The values for $W_{min}$ or $W_{max}$ are set using the above 'test 1' result and a window granularity parameter GW. In one example GW has a value of 2×MSS. The result of 'test 1' is used to perform a binary division of the range $W_{min}$ to $W_{max}$ to narrow in on the optimum window size value. However, since the optimum window size value can change over time it also uses a binary expansion to increase the size of the search range if the range becomes small. This leads to the following four cases:

Case 1: no congestion and large search space ⇒ binary chop search space
If $(W_{max}-W_{min})$>GW AND Test 1=true
Then: $W_{min}=½ (W_{max}+W_{min})$ Case 2: congestion and large search space ⇒ binary chop search space
If $(W_{max}-W_{min})$>GW AND Test 1=false
Then: $W_{max}=½ (W_{max}+W_{min})$ Case 3: no congestion and small search space ⇒ binary grow search space
If $(W_{max}-W_{min})≦GW$ AND Test 1=true
Then: $W_{max}=W_{max}+GW$ Case 4: congestion and small search space ⇒ binary grow search space
If $(W_{max}-W_{min})≦GW$ AND Test 1=false
Then: $W_{min}=W_{min}-GW$ Note that the binary search above is performed when the operation of the process is in the steady state. When the process is first started, an initialization phase is used, in which 'test 1' is run at the end of each control interval. If the test succeeds, $W_{max}$ is doubled, $RTT_{min}$ is updated to $W_n/X_n$, and the process remains in the initialization phase. If 'test 1' fails, $W_{max}$ is set to the maximum of GW and $W_{max}/2$, and the process progresses to the steady-state phase, as outlined above.

Once the change in the search space has been calculated (either by the binary search or in the initialization phase), the new value of the receive window size for the forthcoming control interval can be calculated as:

$$W_{n+1} = \frac{W_{max} + W_{min}}{2}$$

In other words, the new value for the receive window size is the mid-point of the updated search space. However, the value of the receive window size is not given a value less than 2×MSS, to avoid the 'silly window syndrome' (SWS) which arises where a receiver advertises and a sender responds to a very small receive window size. Therefore, if the calculated window size is less than 2×MSS, then $W_{n+1}$ is set to 2×MSS (although note that a further enhancement can be used in the case where the calculated window is less than 2×MSS, as described below with reference to FIG. 7). Furthermore, the actual value of the receive window size that is advertised is preferably an integer multiple of the MSS, so the window size for the subsequent control interval, $W_{n+1}$, is set to k×MSS, where k is the smallest integer such that the calculated receive window size is less than or equal to k×MSS.

The value for the minimum round trip time, $RTT_{min}$, is updated 408, if appropriate. If 'test 1' holds true (i.e. the connection is not congested), then the value for the minimum RTT value is updated as follows:

$$RTT_{min} = (1-\delta)RTT_{min} + \delta\left(\frac{W_n}{X_n}\right)$$

Where $\delta$ is a smoothing parameter used when tracking the minimum RTT. In one example, $\delta$ has a value of 0.1. This updates the value of the minimum RTT to include the current value of the RTT (given by $W_n/X_n$) weighted by $\delta$.

The duration of the subsequent control interval is then calculated 409. As mentioned hereinabove, an excessively large control interval reduces the responsiveness of the background transfer technique, whereas too small a control interval can cause the drunk window syndrome. To avoid this, the value of the control interval used for the subsequent interval is based on the current measured value of the RTT. In one example, the control interval can be set to a multiple of the current RTT. For example, the subsequent control interval can be set to three times the current RTT. However, having the control interval as a linear function depending on the RTT favors background flows with the largest RTT.

More preferably, a plurality of selectable control interval values can be defined of various durations. For example, specific selectable control intervals can be 100 ms, 500 ms, 1 s, 3 s etc. The process then selects the smallest control interval that is greater than a predefined multiple of the current RTT. In one example, the smallest selectable control interval value is chosen that is greater than three times the current RTT. The use of specific selectable control interval values ensures fairness between background flows is preserved because background flows with similar RTT values use the same control interval value.

The new calculated control interval duration is then stored. The new window size is updated 410, such that acknowledgements begin advertising the updated window size. The process in FIG. 4 then repeats, this time using the new control interval.

Therefore, in summary, the process in FIG. 4 measures the behavior of a TCP connection and adjusts itself accordingly, once every control interval, where the duration of a control interval is dynamically selected to suit the current characteristics of the network and properties of the connection in question. At each control interval the process in FIG. 4 records the number of bytes received during the interval and the duration of the interval, from which it calculates the receive rate for the interval and tracks the current RTT.

The process in FIG. 4 searches for the optimal receive window by adjusting the receive window size at every interval in an attempt to bring its search window close to the optimal receive window. Simultaneously with this search the process maintains its estimate of the minimum RTT. If the received rate for an interval is less than expected for the current receive window size and RTT estimate then it assumes that there is increased competition for the network and reduces the receive window for the next control interval. Conversely, if the received rate for an interval is greater than that expected for the current receive window size and RTT estimate then it assumes there is reduced competition for the network and increases the receive window for the next control interval. The duration of the next control interval is dynamically adjusted based on the current RTT estimate to ensure that the process remains responsive but operates reliably.

However, the process of FIG. 4 still operates using control intervals that are asynchronous with the data arrival at the receiver. In addition, the changes to the receive window size can be large enough for the receiver to renege on advertised window sizes, which is not recommended for a RFC compliant TCP implementation. This issue is addressed by the process shown in FIG. 5.

Figure 5:
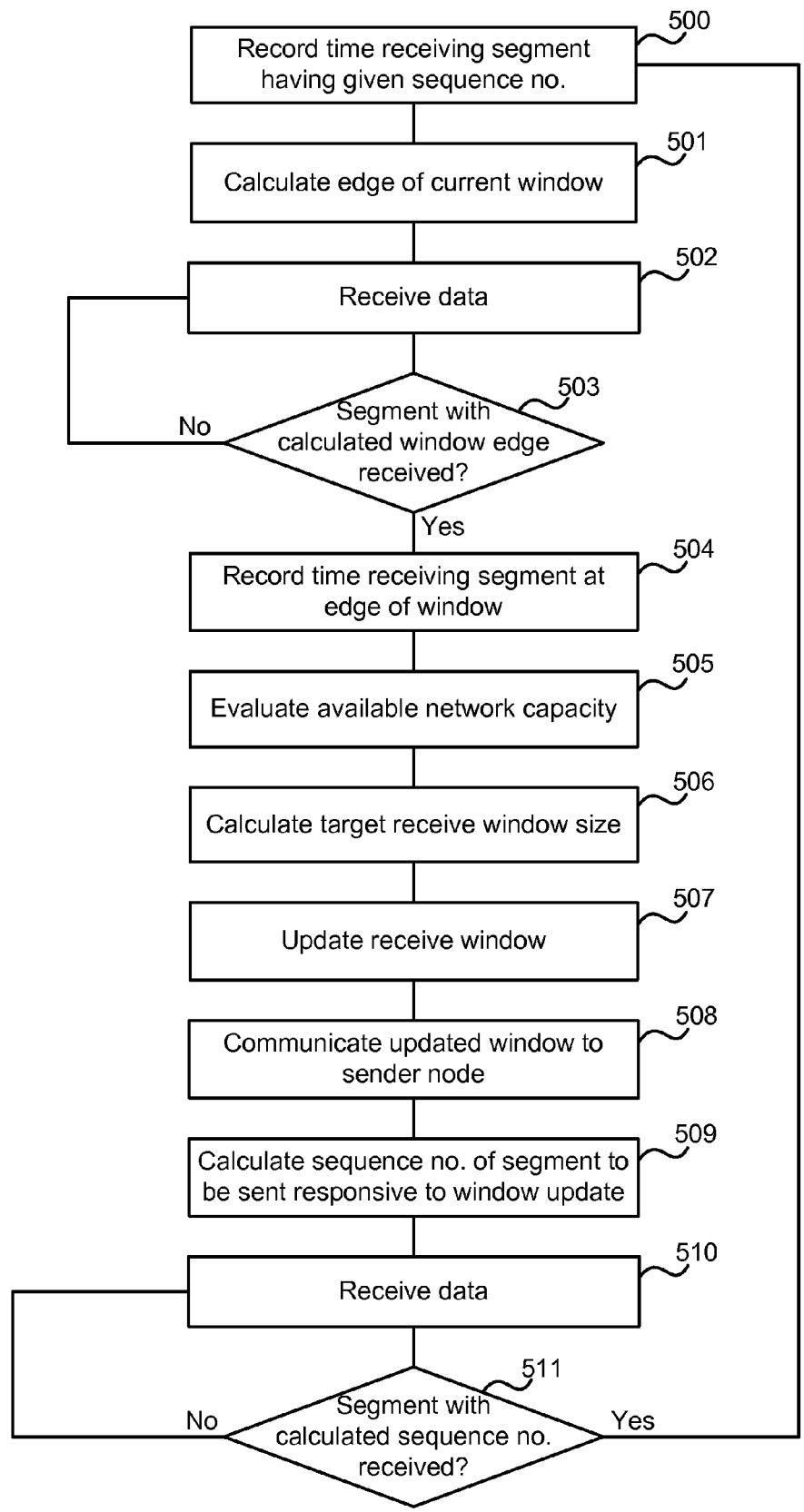
FIG. 5 illustrates a flowchart of a process for controlling a background transfer using window-edge tracking.

FIG. 5 illustrates a flowchart of a process for controlling a background transfer using a technique known as window-edge tracking. Like the dynamic control interval scheme described above with reference to FIG. 4, the window-edge tracking scheme attempts to find the maximum value of the receive window size parameter where the throughput is still on the gradient 200. However, the window-edge tracking does this by eliminating the control intervals, and instead operates on a per-segment basis. The window-edge tracking scheme is outlined below with reference to the flowchart in FIG. 5, and also an example signaling chart shown in FIG. 6. The window-edge tracking scheme is performed at the receiver node 101.

The flowchart in FIG. 5 starts by recording 500 the time of arrival of a segment at the receiver node 101. For example, with reference to FIG. 6, the receiver node 101 records the time T1 of the arrival of segment having the sequence number X+2.

Figure 6:
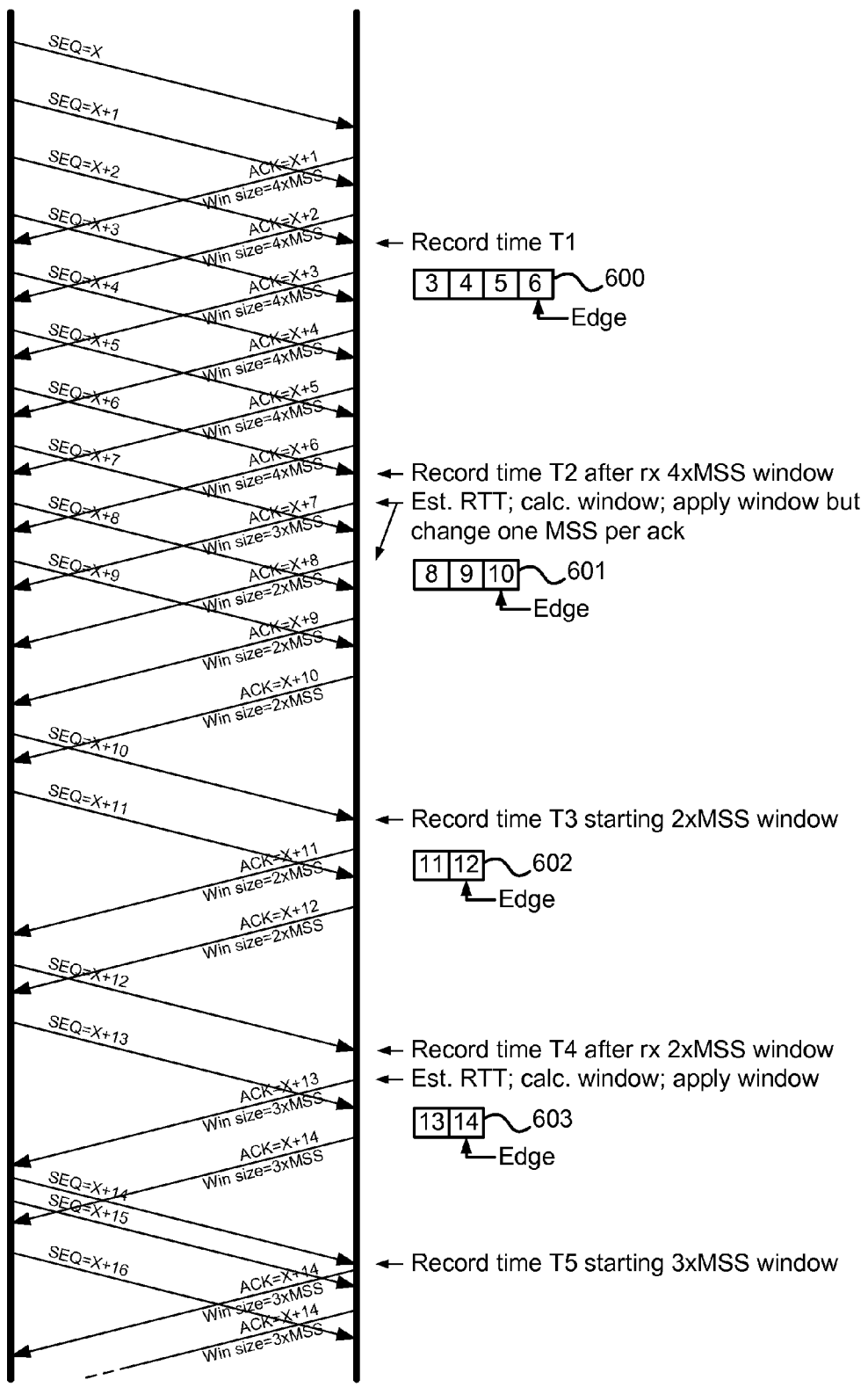
FIG. 6 illustrates an example signaling chart for window-edge tracking.

Note that, in the illustrative example of FIG. 6, the sequence numbers are shown as X, X+1, X+2, etc, where X refers to an integer multiple of the maximum segment size, and the "+n" refers to the addition of n MSSs. In practice, the sequence number refers the number of the first byte in the segment. Also, in the example of FIG. 6, each segment has a size of one MSS. Also note that the recording of time T1 for segment X+2 in FIG. 6 is arbitrary and for example purposes only. This segment is chosen as the start time merely because the connection flow is in the steady state at this point.

The receiver node 101 then calculates 501 the edge of the current window. In other words, the receiver node 101 calculates the sequence number of the last segment that is to be received for the forthcoming window. This is illustrated in FIG. 6 with window 600. The current window size in FIG. 6 is 4×MSS, and the next segment expected at the receiver is X+3 (as indicated in the acknowledgement sent responsive to receiving the segment X+2). Therefore, the sequence number at the window edge is X+6.

The receiver node 101 then receives 502 a number of segments, and tracks the sequence numbers until it is determined 503 that the previously-noted window edge sequence number is received (i.e. X+6 in FIG. 6). The time at which this segment is received is recorded 504. This is shown as time T2 in FIG. 6.

The times recorded (T1 and T2) are then used to evaluate 505 the available network capacity. For example, the recorded times are used to determine whether the connection is contending with other traffic on the link. This can be achieved by determining whether the connection is operating in the portion of the graph having the gradient 200 in FIGS. 2 and 3, in which the throughput changes linearly with window size.

As outlined above with reference to FIG. 4, the gradient 200 seen in the absence of congestion is given by $1/RTT_{min}$. This is because, in the absence of congestion (i.e. if the throughput is limited by the window), a full window of bytes is received in one RTT. The current RTT for the connection can be accurately estimated by T2-T1 (the time to receive a window-full of bytes).

The following test is therefore used to determine whether the link is congested (denoted herein as 'test 2'):

$$RTT_{current} \leq (1+\epsilon)RTT_{min}$$

Where $RTT_{current}$ is the current estimate of the RTT (e.g. given by T2-T1), $RTT_{min}$ is the minimum value for the RTT on the connection (as outlined above with reference to FIG. 4, and described hereinafter), and $\epsilon$ is a threshold for deciding whether an RTT value is sufficiently close to the minimum RTT to be indicative of no congestion.

In one example, $\epsilon$ has a fixed value, e.g. 0.1. In another example, $\epsilon$ is dynamic, and changes to improve the fairness between background flows competing for bandwidth. When a background transfer connection is competing with a regular TCP connection, the background transfer backs off into a mode where it is only occasionally sending packets to continue to monitor for the end of the competing flow (as described in more detail below). However, when a background transfer connection is competing, not with regular TCP, but with another background transfer connection, then it is preferable for it to get fair share and not back off completely. This can be achieved by making the background transfer more sensitive to potential competition as the achieved rate increases. Even a slight change stabilizes at the fair share value. The value for $\epsilon$ is therefore dynamically changed in dependence on the current window size using the following equation:

$$\varepsilon = \varepsilon_{init}\left(1 + \frac{1}{1 + (W_{current}/2 \times MSS)}\right)$$

Where $\epsilon_{init}$ is an initialization value for $\epsilon$ (e.g. 0.1 in one example) and $W_{current}$ is the current window size.

The above 'test 2' is then used to calculate 506 a new target receive window size. As described hereinabove, the aim of the background transfer control process is to control the receive window size to be the maximum value whilst still on the gradient 200 of FIGS. 2 and 3 (i.e. window size 202 in FIG. 2 and window size 301 in FIG. 3). This is the optimum receive window size.

If 'test 2' holds true, then the receive window is increased in size. Conversely, if the test fails, then the receive window is decreased in size. The optimum window size to advertise is found and tracked dynamically using a binary search of the same type as that described above with reference to FIG. 4.

The values for $W_{min}$ or $W_{max}$ in the binary search are set using the above 'test 2' result and the window granularity parameter GW. In one example GW has a value of 2×MSS. The result of 'test 2' is used to perform a binary division of the range $W_{min}$ to $W_{max}$ to narrow in on the optimum window size value. However, since the optimum window size value can change over time it also uses a binary expansion to increase the size of the search range if the range becomes small. This leads to the same four cases as above (included again for completeness):

Case 1: no congestion and large search space ⇒ binary chop search space
If $(W_{max}-W_{min})>GW$ AND Test 2=true
Then: $W_{min}=\frac{1}{2}(W_{max}+W_{min})$ Case 2: congestion and large search space ⇒ binary chop search space
If $(W_{max}-W_{min})>GW$ AND Test 2=false
Then: $W_{max}=\frac{1}{2}(W_{max}+W_{min})$ Case 3: no congestion and small search space ⇒ binary grow search space If $(W_{max}-W_{min}) \leq GW$ AND Test 2=true
Then: $W_{max}=W_{max}+GW$ Case 4: congestion and small search space ⇒ binary grow search space
If $(W_{max}-W_{min}) \leq GW$ AND Test 2=false
Then: $W_{min}=W_{min}-GW$ Once the change in the search space has been calculated, the new value of the receive window size can be calculated as the mid-point of the updated search space, as follows:

$$W_{new} = \frac{W_{max} + W_{min}}{2}$$

The value of the receive window size is not given a value less than 2×MSS, to avoid the 'silly window syndrome' (SWS). Therefore, if the calculated window size is less than 2×MSS, then the new window size can be set to 2×MSS (although note that a further enhancement can be used in the case where the calculated window is less than 2×MSS, as described below with reference to FIG. 7). Furthermore, the actual value of the receive window size that is advertised is preferably an integer multiple of the MSS, so the new window size is set to k×MSS, where k is the smallest integer such that the calculated receive window size is less than or equal to k×MSS.

Once the new receive window size has been calculated, the receive window is updated 507. The calculation of the new receive window is performed in the time period between receiving the last segment in the previous window (T2 in FIG. 6) and transmitting the acknowledgement for this segment. With reference to FIG. 6, as an example the new receive window size is calculated to be 2×MSS (changing from 4×MSS).

The new receive window size is communicated 508 to the sender node starting with the acknowledgement to last segment in the previous window. The change in the advertised window size is controlled so as not to be excessively large, such that the receiver does not renege on a previously advertised window size. To avoid this occurring, the window-edge tracking scheme is arranged to change the window size progressively in stages, by one MSS per acknowledgement message. This can be seen occurring in the example of FIG. 6. After T2, the window-edge tracking scheme has determined that the window size is to be decreased from 4×MSS to 2×MSS. To do this, the first acknowledgement sent after updating the window size (ACK=X+7) advertises a window size of 3×MSS (i.e. a decrease of one MSS), and then the subsequent acknowledgement (ACK=X+8) advertises a window of 2×MSS (i.e. a further decrease of one MSS).

If the advertised window had been decreased from 4×MSS to 2×MSS in one step, then the receiver reneges on the window. For example, if ACK=X+7 in FIG. 6 had advertised a window of 2×MSS, then the sender would receive the message indicating that there can only be two segments concurrently in flight, but at that point there are already three unacknowledged segments in flight (sequence numbers X+7, X+8, and X+9).

The receiver node calculates 509 the sequence number of the segment that is to be received responsive to the sender node receiving the acknowledgement comprising the new window size. This is performed so that the receiver node knows when the sender has received and is acting on the new window size (and hence can start accurately monitoring the RTT again). For example, with reference to FIG. 6, at ACK=X+8 (which is when the window size of 2×MSS is first advertised), the receiver knows that immediately prior to the change in window size a 3×MSS window was advertised, and hence three segments are to be received before the sender is responding to the new window. This can be seen with window 601, which indicates that the edge of the current window is the segment with sequence number X+10.

The receiver node 101 then receives 510 data segments and tracks the sequence numbers until it is determined 511 that the calculated sequence number has been received (e.g. sequence number X+10). At this point, the process repeats. For example, with reference to FIG. 6, time T3 is recorded, and after a window of 2×MSS has been received (see window 602) time T4 is recorded. The time interval T4-T3 is used to estimate the RTT, and a new window size calculated. In this example, the window size is increased to 3×MSS, which is advertised to the sender node in ACK=X+13. The segment responsive to the application of the new window is calculated to have sequence number X+14 (see window 603), and from there the process can repeat yet again.

The process illustrated in FIGS. 5 and 6 therefore controls the background transfer on a per-segment basis. In particular, the process uses one RTT to measure the receipt of the data and estimate the current round trip time. In this measurement RTT, the window is not changed to allow an accurate measurement. After the measurement a new window is calculated, and a further RTT is used to apply the change, and allow the change to take effect. Therefore, the process operates in alternate flights of segments.

The receiver node does not renege on advertised windows in the window-edge tracking scheme, as the window sizes are not decreased by more than one MSS per acknowledgement. This scheme is also very responsive to changes, as it operates on a per-segment basis, and does not require control intervals in the order of a large number of RTTs. In addition, the accuracy of the RTT estimates are high, as they directly relate to the time to transfer a window of data. Furthermore, the window-edge tracking scheme does not require the use of timers (only recording of arrival times), which simplifies implementation.

The two schemes described with reference to FIG. 4 and FIG. 5 can be called window searching techniques, as they both attempt to find the maximum value for the window size that is on the gradient 200 of FIGS. 2 and 3. However, both of these schemes are limited in that it is preferable not to reduce the window size below 2×MSS to avoid the silly window syndrome. As described above, these schemes can simply limit the size of the window to being a minimum of 2×MSS, and no lower. However, these schemes can be further enhanced by the addition of a different mode that is activated when the calculated window size is less than 2×MSS. This is called 'rate limiting mode'.

Figure 7:
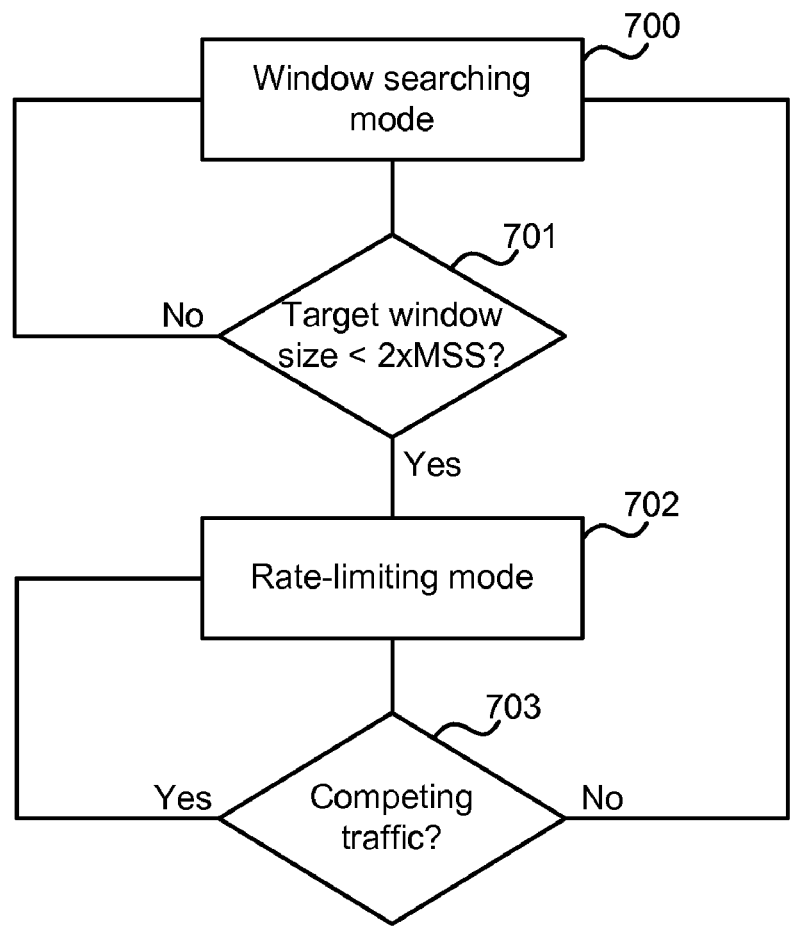
FIG. 7 illustrates a flowchart of a process combining a window searching mode and a rate limiting mode.

FIG. 7 illustrates a flowchart for the combined operation of a window searching mode (such as in FIG. 4 or 5) and a rate limiting mode. When the background transfer control process is operating in a window searching mode 700 (as described above), then it is checked 701 whenever a new window size is calculated whether the calculated receive window size is less than 2×MSS. For example this check can be performed at block 407 with reference to FIG. 4, or block 506 with reference to FIG. 5. If the receive window size is not less than 2×MSS, then the process remains in window searching mode.

However, if the receive window size is less than 2×MSS, then the process enters rate limiting mode 702. The rate limiting mode sometimes advertises a window of 2×MSS and sometimes advertises a window of zero, as described in more detail with reference to FIG. 8, hereinafter. When in rate limiting mode, it is checked 703 whether it is likely that there is other competing traffic. If so, then the process remains in rate limiting mode 702. However, if it is likely that there is no competing traffic, then the process returns to window searching mode 700. The process for checking for competing traffic is also outlined in detail with reference to FIG. 8.

Figure 8:
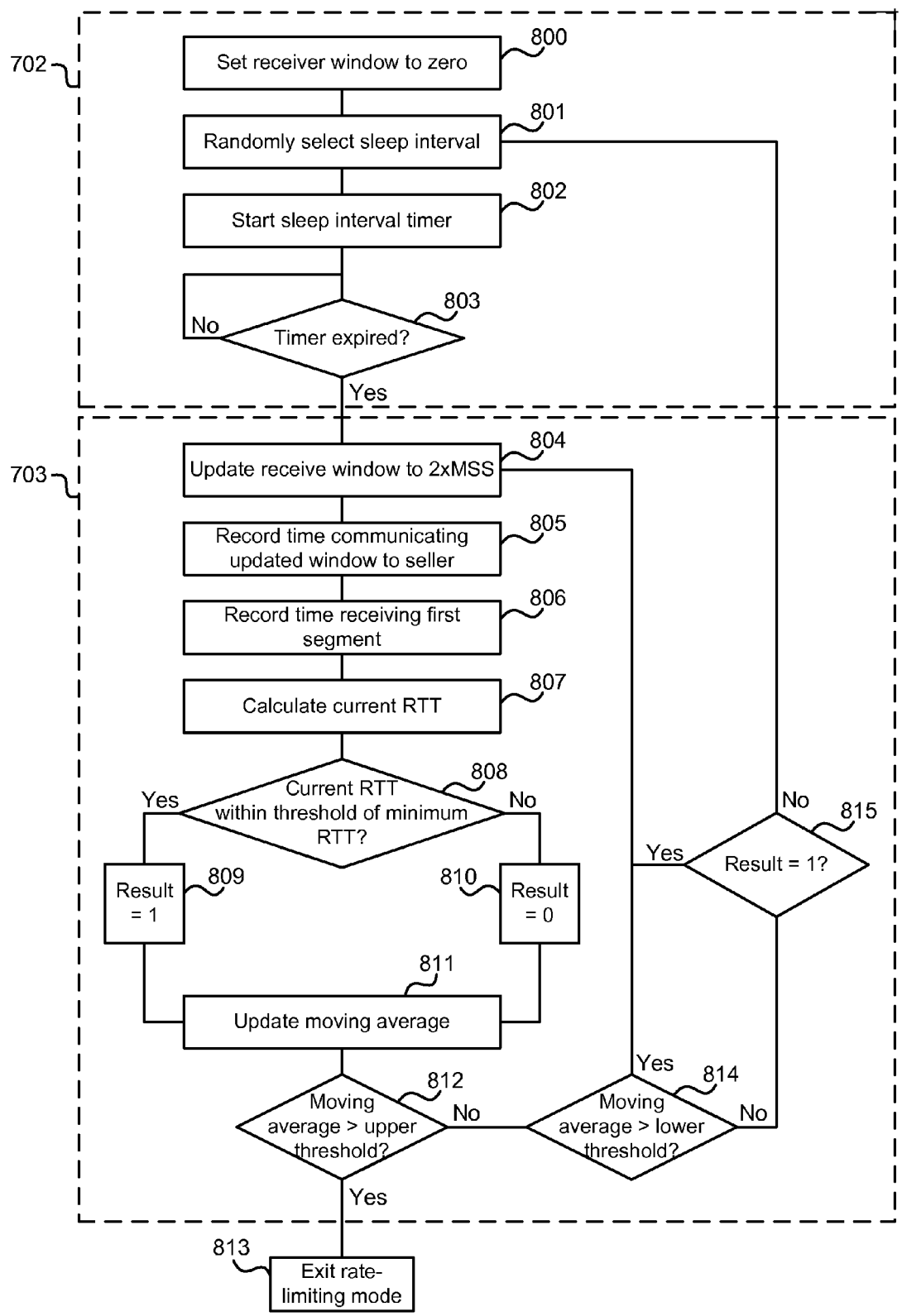
FIG. 8 illustrates a flowchart of a process for controlling a background transfer using the rate limiting mode.

FIG. 8 illustrates a flowchart of a process for controlling a background transfer using the rate limiting mode. In rate limiting mode the background transfer almost halts progress on the connection. However, it does not completely halt it because it wishes to sample the network regularly in order to spot when the competing traffic has gone away and if so responsively return to window searching mode.

The first portion of the flowchart in FIG. 8 shows the rate limiting mode 702 block of FIG. 7. Upon entering the rate limiting mode, the receiver node 101 sets 800 the receive window size to zero. This is communicated to the sender node 102 in an acknowledgement, and the sender node stops sending data on this connection. A random sleep interval is then selected 801. In one example, the sleep interval is a randomly selected multiple of the RTT. The multiple of the RTT can be a uniformly distributed random variable taking values between, for example, 1 and 15. The random component of the sleep interval decouples multiple background flows so that they do not sample the network at the same time and prevent each other from returning to window searching mode.

Once the random sleep time is selected, a sleep timer having the random value is started 802, and the receiver node waits 803 until the timer expires. Upon expiry of the random sleep time, the process enters the second portion of the flowchart in FIG. 8, which shows the check 703 to determine whether to exit rate limiting mode.

The receiver node 101 opens 804 the receive window to a size of 2×MSS. This is communicated to the sender node 102 in an acknowledgement message (which is a window update, and not sent responsive to any received data). The time at which the updated window size is sent to the sender node 102 is recorded 805. Upon receiving the updated window size, the sender node 102 immediately sends two segments to the receiver node. The receiver node 101 records 806 the time that it receives the first of these two segments. The receiver node closes the receive window after opening it, such that only the two segments are received.

An accurate measurement of the current RTT can then be made, by calculating 807 the time delay between sending the acknowledgement to open the receive window, and receiving the first segment in response to this. This is found by subtracting the time of sending the window update from the time of arrival of the first segment.

It is then determined whether the current RTT just measured is within a threshold of the minimum RTT (the same minimum RTT used in the processes of FIGS. 4 and 5, above). This can be performed using the same Boolean test as outlined above with reference to FIG. 5, i.e.:

$$RTT_{current} \leq (1+\epsilon)RTT_{min}$$

If the current RTT is sufficiently close to the minimum RTT, then this indicates that there is no congestion on the link. In order to determine whether to exit the rate limiting mode, a moving average of the results of this Boolean test is maintained. Therefore, if the current RTT is sufficiently close to the minimum RTT, then the result 809 is true, and the moving average is updated 811 with a value of one. Conversely, if the current RTT is not sufficiently close to the minimum RTT, then the result 810 is false, and the moving average is updated 811 with a value of zero. In one example, the moving average is an exponentially weighted moving average. The exponentially weighted moving average can, for example, have a smoothing factor of 0.1.

The updated moving average is then compared 812 to an upper threshold value. If the updated moving average value exceeds the upper threshold, then this indicates that there is a high confidence that there is no competing traffic, and the rate limiting mode is exited 813. The operation then returns to the window searching mode 700, as shown in FIG. 7. In one example, the upper threshold value is 0.8.

If the updated moving average value does not exceed the upper threshold, then it is determined 814 whether the moving average value exceeds a lower threshold. In one example, the lower threshold value is 0.65. If the updated moving average value exceeds the lower threshold, then this indicates that there is a reasonable likelihood that there is no competing traffic, and another sample of the RTT is taken without delay. The process then reopens the window to 2×MSS and takes another RTT sample (i.e. the process in block 703 in FIG. 8 is repeated).

If the updated moving average value does not exceed the lower threshold, then it is possible that congestion remains on the link. However, it is also possible that the situation has recently changed, such that congestion is now no longer present on the link, but the moving average has not yet changed sufficiently to reflect this. Therefore, if the updated moving average value does not exceed the lower threshold, but the current RTT is sufficiently close to the minimum RTT (i.e. it is determined 815 that the result 809 is true) then another sample of the RTT is taken without delay. This ensures that the exit from rate limiting mode is highly responsive to the end of congestion. If, however, the current RTT is not sufficiently close to the minimum RTT, the receiver node remains in rate limiting mode, and goes back to sleep for a randomly selected interval as described above.

The process shown in FIG. 8 therefore exits rate limiting mode if more than a significant fraction of the observed RTT samples are close to the minimum RTT. This process provides the rate limiting mode with robustness to occasional noise, high responsiveness to the end of congestion, and very low use of the network when congestion is present.

Each of the different schemes described above with reference to FIGS. 4, 5 and 8 utilize a value for the minimum RTT. Therefore, having an accurate value for the minimum RTT of the connection improves the performance of the described processes. For example, an incorrect value of the minimum RTT can cause the background transfer to not back-off in the presence of competing traffic, but instead to compete like a regular TCP connection until the congestion departs sufficiently for a lower (more accurate) minimum RTT sample can be obtained.

In order to obtain an accurate initial estimate of the minimum RTT, the background transfer process can be arranged to start initially in the rate limiting mode described above with reference to FIG. 8. The rate limiting mode has a very low-impact nature, as it only opens the receive window briefly for the purposes of obtaining an RTT sample. The RTT sample obtained is very accurate, as it directly measures the delay in receiving a segment after opening the receive window.

If the background transfer is started in rate limiting mode, then the first RTT sample taken is used as the value for the minimum RTT. Whilst in rate limiting mode, any RTT samples that are lower than the minimum RTT can update the value of the minimum RTT. If there is no competition on the link then the process switches rapidly from rate limiting to window searching mode after obtaining an accurate minimum RTT sample If the real minimum RTT changes upwards as a result of a route change in the network then the background transfer control process believes that the higher RTTs obtained are indicative of congestion. To avoid this, a minimum RTT change can be distinguished from a long-lasting contention using the shape of the distribution of the RTT values. This can be used to trigger the discarding of the old minimum RTT value, and the measurement of a new one. For example, if one or more measured round trip times differ from a mean value maintained for the RTT by more than a predetermined multiple of the standard deviation, then this can indicate a change in the minimum RTT.

In the above-described examples, the receive window size that is selected by the background transfer control process should reflect that advertised in the acknowledgements. However, in some circumstances this is not necessarily the case, for example if TCP window scaling is enabled. TCP window scaling is an option to increase the TCP receive window size above its maximum value by applying a scaling factor. If TCP window scaling factor is enabled then the background transfer control process makes sure that the advertised window it sets is the least multiple of scaling factor.

Note that, in the above described examples, the receive window size can be adjusted by adjusting the receive buffer size at the receiver node at the application level of the receiver node (e.g. at the socket layer). However, in other implementations, the receive window size can be adjusted directly (e.g. through the transport level) or though other indirect means. By at least these various means, the receive windows size can be adjusted and communicated to the sender node, which can adjust its send window size in accordance with the adjusted received window size.

Figure 9:
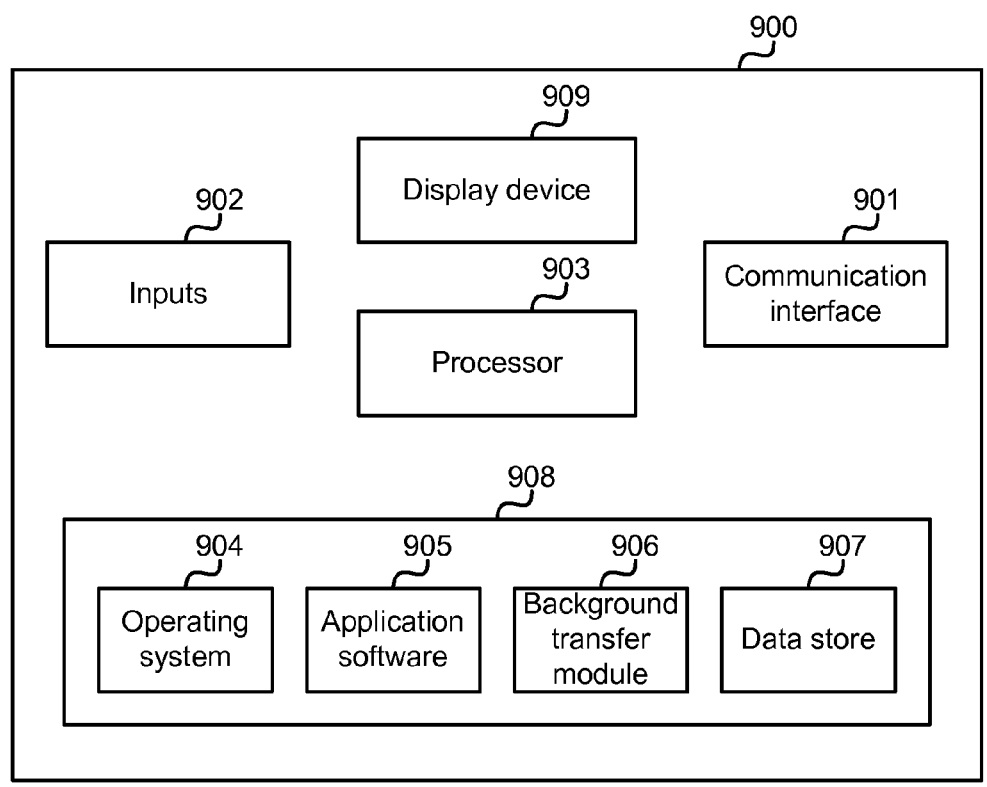
FIG. 9 illustrates an exemplary computing-based device in which embodiments of the background transfer techniques can be implemented.

FIG. 9 illustrates various components of an exemplary computing-based device 900 which can be implemented as any form of a computing and/or electronic device, and in which embodiments of the background transfer control technique can be implemented.

The computing-based device 900 comprises a communication interface 901 arranged to transmit and receive data over the network 100. The computing-based device 900 also comprises one or more inputs 902 which are of any suitable type for receiving, for example, user inputs, voice data, media content, etc.

Computing-based device 900 also comprises one or more processors 903 which can be microprocessors, controllers or any other suitable type of processors for processing computing executable instructions to control the operation of the device in order to control background data transfers. Platform software comprising an operating system 904 or any other suitable platform software can be provided at the computing-based device to enable application software 905 to be executed on the device. Also executed by the processor 903 is a background transfer module 906, which implements the above-described background transfer control processes. The background transfer module 906 can be implemented as part of the operating system 904, as part of application software 905, embedded within software on the communication interface 901, or implemented as a stand-alone module. A data store 907 can be provided to store data relating to the background transfer module 906 or other software.

The computer executable instructions can be provided using any computer-readable media, such as memory 908. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output is also provided such as an audio and/or video output to a display system 909 integral with or in communication with the computing-based device. The display system can provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   receiving, at a receiver node, a first data sequence from a sender node;
   defining, at the receiver node, a first window size as a default window size that corresponds to a default data sequence size from the sender node;
   measuring, at the receiver node, a time period to receive the first data sequence from the sender node;
   evaluating, at the receiver node, available capacity of a network path based on the time period;
   calculating, at the receiver node, a second window size based on the available capacity of the network path;
   changing, at the receiver node, a receive window size from the first window size to the second window size; and
   communicating the second window size to the sender node subsequent to receiving the first data sequence, thereby controlling background data transfer over the network path at the receiver node, such that the sender node transmits a subsequent data sequence according to the second window size.

2. A method according to claim 1, wherein the second window size is communicated to the sender node using an acknowledgement message sent responsive to receiving a final segment of the first data sequence.

3. A method according to claim 1, wherein changing the receive window size comprises updating the receive window from the first window size to the second window size in a plurality of stages.

4. A method according to claim 3, wherein each of the plurality of stages comprises a change in the receive window size of a predetermined multiple of a maximum segment size.

5. A method according to claim 4, wherein the predetermined multiple of a maximum segment size is one maximum segment size.

6. A method according to claim 3, wherein the second window size is communicated to the sender node using a plurality of acknowledgment messages corresponding to the plurality of stages.

7. A method according to claim 1, further comprising measuring a time period to receive from the sender node a second data sequence of a size corresponding to the second window size for the receive window.

8. A method according to claim 7, wherein a start of the time period to receive the second data sequence is a receipt time of a segment sent from the sender node responsive to the communication of the second window size.

9. A method according to claim 1, wherein evaluating available network capacity based on the time period comprises determining whether the time period is within a threshold value of a minimum round trip time.

10. A method according to claim 9, wherein:
   if the time period is within the threshold value of the minimum round trip time, calculating the second window size based on the available network capacity comprises increasing the first window size; and
   if the time period is not within the threshold value of the minimum round trip time, calculating the second window size based on the available network capacity comprises decreasing the first window size.

11. A method according to claim 1, wherein calculating the second window size based on the available network capacity comprises determining an amount by which to increase or decrease the first window size to obtain a target window size that is between a maximum value that the first window size can be without contending with other traffic and a calculated minimum value of the first window size.

12. A method according to claim 11, wherein the second window size is set to the largest integer multiple of a maximum segment size that is less than the target window size.

13. A method according to claim 11, wherein determining the amount by which to increase or decrease the first window size to obtain the target window size comprises a binary search.

14. A method according to claim 11, wherein calculating the second window size further comprises determining whether the target window size is less than a predefined multiple of a maximum segment size, and, if so, setting the second window size to zero; and the method further comprises starting a timer for a randomly selected time interval subsequent to communicating the second window size to the sender node.

15. A method according to claim 14, further comprising, on expiry of the timer, setting the receive window size to a non-zero multiple of the maximum segment size, communicating the receive window size to the sender node, determining a time interval until a segment is received from the sender node, and comparing the time interval to a minimum round trip time value to determine if the network is congested.

16. A method comprising:
   receiving, at a receiver node, a first quantity of data from a sender node;
   defining, at the receiver node, a first window size as a default window size that corresponds to a default quantity of data from the sender node;
   measuring, at the receiver node, the quantity of data received from the sender node during a first control interval;
   evaluating, at the receiver node, available capacity of the network path based on the quantity of data;
   calculating, at the receiver node, a second window size based on the available capacity of the network path;
   calculating, at the receiver node, a duration for a second control interval based on the available capacity of the network path;
   changing, at the receiver node, a receive window size from the first window size to the second window size for the second control interval; and
   communicating the second window size to the sender node, thereby controlling background data transfer over the network path at the receiver node, such that the sender node transmits a subsequent quantity of data according to the second window size.

17. A method according to claim 16, wherein the duration for the second control interval is selected from a plurality of predefined control interval durations.

18. A method according to claim 17, wherein evaluating available network capacity comprises estimating a current round trip time for the data.

19. A method according to claim 18, wherein the duration for the second control interval is selected to be the smallest duration in the plurality of predefined control interval durations within a predefined multiple of the current round trip time.

20. A method comprising:
   receiving, at a receiver node, a first data sequence from a sender node;

defining, at the receiver node, a first window size as a default window size that corresponds to a default data sequence size from the sender node;

measuring, at the receiver node, a time period to receive the first data sequence from the sender node;

comparing, at the receiver node, the time period to a stored minimum round trip time value to determine available capacity of a network path;

calculating, at the receiver node, a second window size based on the available capacity of the network path, such that the second window size is decreased relative to the first window size if the available capacity of the network path indicates network congestion and the second window size is increased relative to the first window size if the available capacity of the network path indicates an absence of network congestion;

changing, at the receiver node, a receive window size from the first window size to the second window size; and communicating the second window size to the sender node subsequent to receiving the first data sequence, thereby controlling background data transfer over the network path at the receiver node, such that the sender node transmits a subsequent data sequence according to the second window size.

* * * * *